(12) United States Patent
Kim et al.

(10) Patent No.: US 12,159,999 B2
(45) Date of Patent: Dec. 3, 2024

(54) AMORPHOUS SILICON-CARBON COMPOSITE, PREPARATION METHOD THEREFOR, AND LITHIUM SECONDARY BATTERY COMPRISING SAME

(71) Applicants: LG ENERGY SOLUTION, LTD., Seoul (KR); UNIST (ULSAN NATIONAL INSTITUTE OF SCIENCE AND TECHNOLOGY), Ulsan (KR)

(72) Inventors: Jangbae Kim, Daejeon (KR); Soojin Park, Ulsan (KR); Jonghyun Chae, Daejeon (KR); Jihye Yang, Daejeon (KR); Taesoo Bok, Ulsan (KR); Dongki Hong, Ulsan (KR); Jaegeon Ryu, Ulsan (KR); Seokkeun Yoo, Ulsan (KR)

(73) Assignees: LG ENERGY SOLUTION, LTD., Seoul (KR); UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 0 days.

(21) Appl. No.: 18/110,153

(22) Filed: Feb. 15, 2023

(65) Prior Publication Data

US 2023/0197957 A1    Jun. 22, 2023

Related U.S. Application Data

(62) Division of application No. 16/769,909, filed as application No. PCT/KR2019/002843 on Mar. 12, 2019, now Pat. No. 11,616,233.

(30) Foreign Application Priority Data

Mar. 14, 2018 (KR) .................. 10-2018-0029924
Mar. 8, 2019 (KR) .................. 10-2019-0026971

(51) Int. Cl.
H01M 4/587 (2010.01)
H01M 4/04 (2006.01)
(Continued)

(52) U.S. Cl.
CPC ......... *H01M 4/587* (2013.01); *H01M 4/0471* (2013.01); *H01M 4/133* (2013.01);
(Continued)

(58) Field of Classification Search
CPC ......... H01M 10/0525; H01M 10/0565; H01M 4/587; H01M 4/62; H01M 4/04
See application file for complete search history.

(56) References Cited

U.S. PATENT DOCUMENTS

| 4,806,612 A | 2/1989 | Chandra et al. |
| 2003/0215711 A1 | 11/2003 | Aramata et al. |

(Continued)

FOREIGN PATENT DOCUMENTS

| CN | 102214817 A | 10/2011 |
| CN | 102637874 A | 8/2012 |

(Continued)

OTHER PUBLICATIONS

Machine Translation of: FR 2,666,799 A, Alain, Mar. 20, 1992.*

(Continued)

*Primary Examiner* — Kenneth J Douyette
(74) *Attorney, Agent, or Firm* — Birch, Stewart, Kolasch & Birch, LLP

(57) ABSTRACT

An amorphous silicon-carbon composite, a method for preparing the amorphous silicon-carbon composite using a pyrolysis method, a negative electrode for a lithium secondary battery, and a lithium secondary battery including the same.

12 Claims, 8 Drawing Sheets

(51) Int. Cl.
*H01M 4/13* (2010.01)
*H01M 4/133* (2010.01)
*H01M 4/38* (2006.01)
*H01M 4/62* (2006.01)
*H01M 10/0525* (2010.01)
*H01M 4/02* (2006.01)

(52) U.S. Cl.
CPC ........... *H01M 4/386* (2013.01); *H01M 4/621* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2012/0251797 A1 | 10/2012 | Smith et al. |
| 2014/0023929 A1 | 1/2014 | Fukui et al. |
| 2014/0346410 A1 | 11/2014 | Lu et al. |
| 2015/0028263 A1 | 1/2015 | Wang et al. |
| 2015/0368113 A1 | 12/2015 | Cho et al. |
| 2016/0276668 A1 | 9/2016 | Nagayama et al. |
| 2017/0012278 A1 | 1/2017 | Verma |
| 2018/0269519 A1 | 9/2018 | Jo et al. |
| 2019/0016601 A1 | 1/2019 | Lyubina |
| 2020/0317529 A1 | 10/2020 | Lyubina et al. |

FOREIGN PATENT DOCUMENTS

| | | |
|---|---|---|
| CN | 103022451 A | 4/2013 |
| CN | 106415894 A | 2/2017 |
| FR | 2 666 799 A1 | 3/1992 |
| FR | 2 984 867 A1 | 6/2013 |
| JP | 64-66238 A | 3/1989 |
| JP | 6-263423 A | 9/1994 |
| JP | 3060077 B2 | 7/2000 |
| JP | 5169248 B2 | 3/2013 |
| JP | 2013-65496 A | 4/2013 |
| JP | 2015-133284 A | 7/2015 |
| JP | 2016-91915 A | 5/2016 |
| JP | 2019-21630 A | 2/2019 |
| KR | 10-2014-0048573 A | 4/2014 |
| KR | 10-1583216 B1 | 1/2016 |
| KR | 10-1612603 B1 | 4/2016 |
| KR | 10-2017-0069163 A | 6/2017 |
| KR | 10-1773213 B1 | 8/2017 |
| WO | WO 2012/105672 A1 | 8/2012 |
| WO | WO 2017/148911 A1 | 9/2017 |

OTHER PUBLICATIONS

Extended European Search Report for European Application No. 19767922.8, dated Jan. 13, 2021.
International Search Report for PCT/KR2019/002843 mailed on Jun. 17, 2019.
Ko et al., "Scalable synthesis of silicon-nanolayer-embedded graphite for high-energy lithium-ion batteries", Nature Energy, Aug. 8, 2016, vol. 1, Article No. 16113, pp. 1-8.
Xu et al., "Watermelon-Inspired Si/C Microspheres with Hierarchical Buffer Structures for Densely Compacted Lithium-Ion Battery Anodes", Advanced Energy Materials, 2016, vol. 7, No. 3, 1601481, total 6 pages.
Zheng et al., "Research progress of composite cathode materials for lithium ion batteries", New Chemical Materials, vol. 42, No. 7, Jul. 2014, pp. 18-20 with an English abstract.

* cited by examiner

[Figure 1]
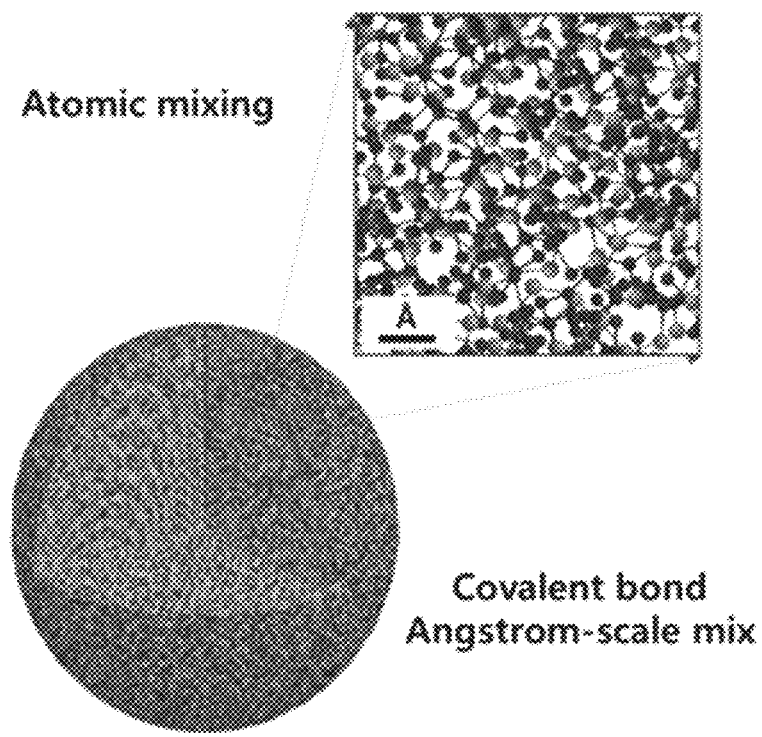

[Figure 2]
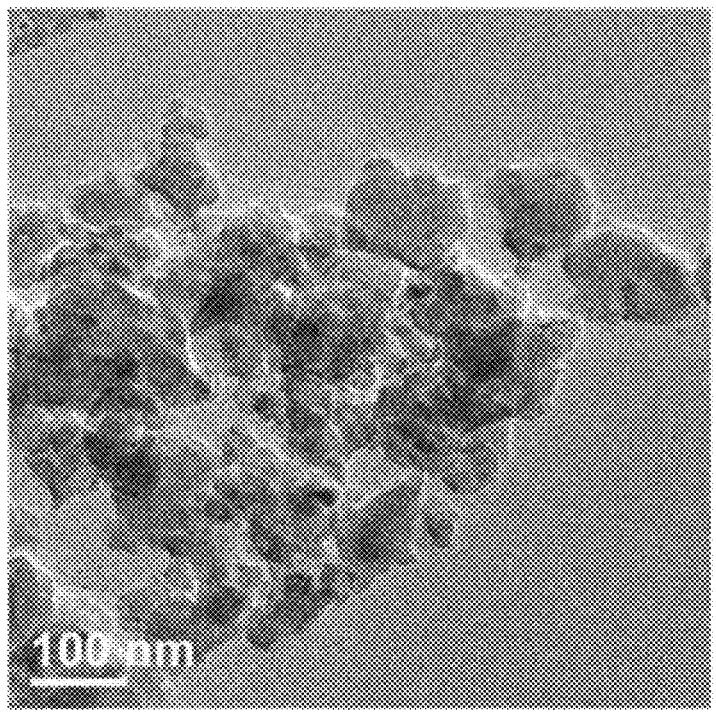
[Figure 3]
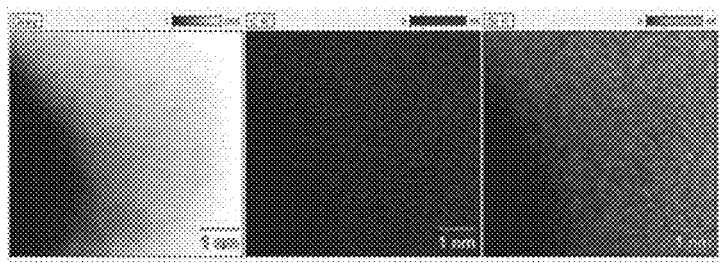

[Figure 4]
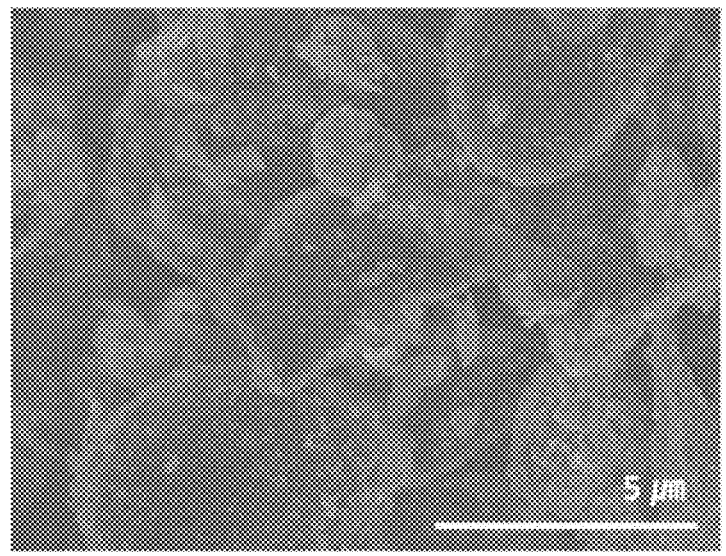
[Figure 5]
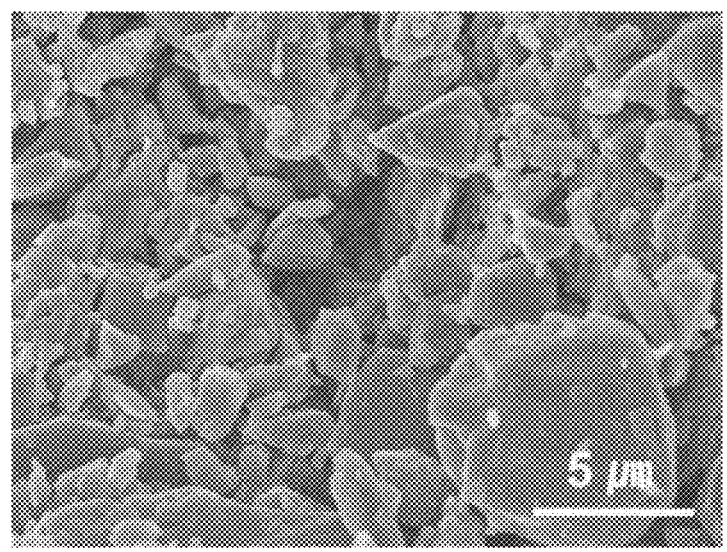

[Figure 6]
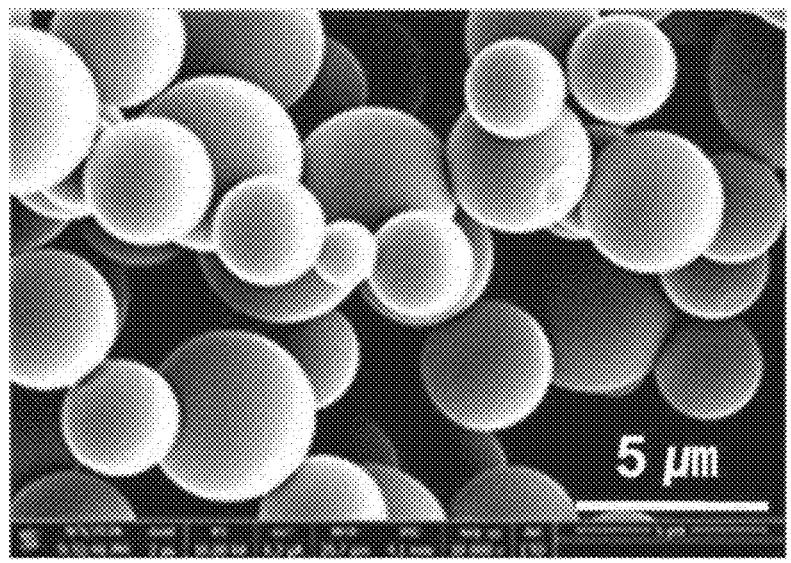
[Figure 7]
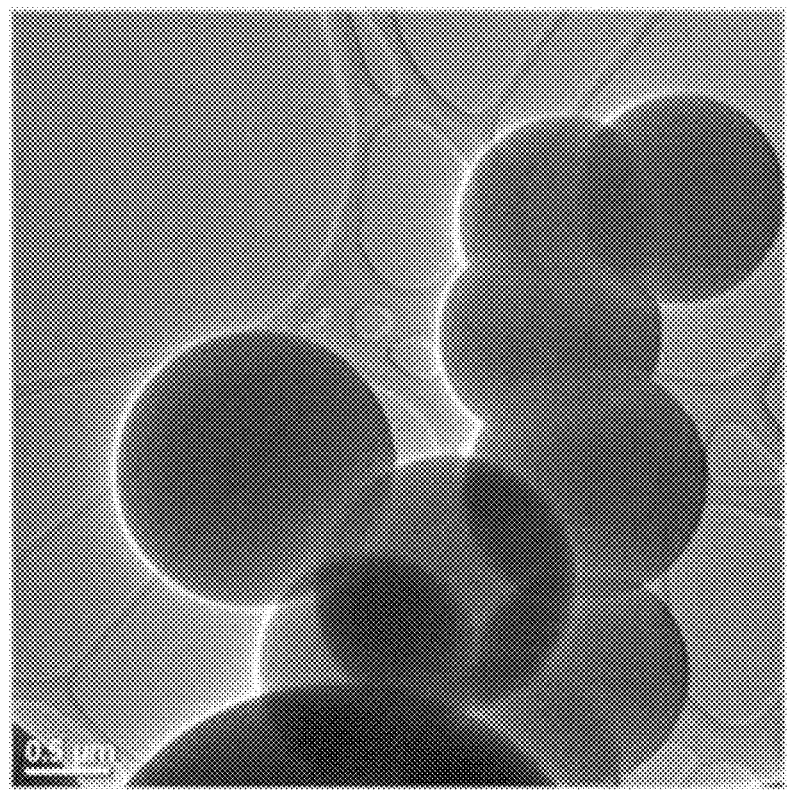

[Figure 8]
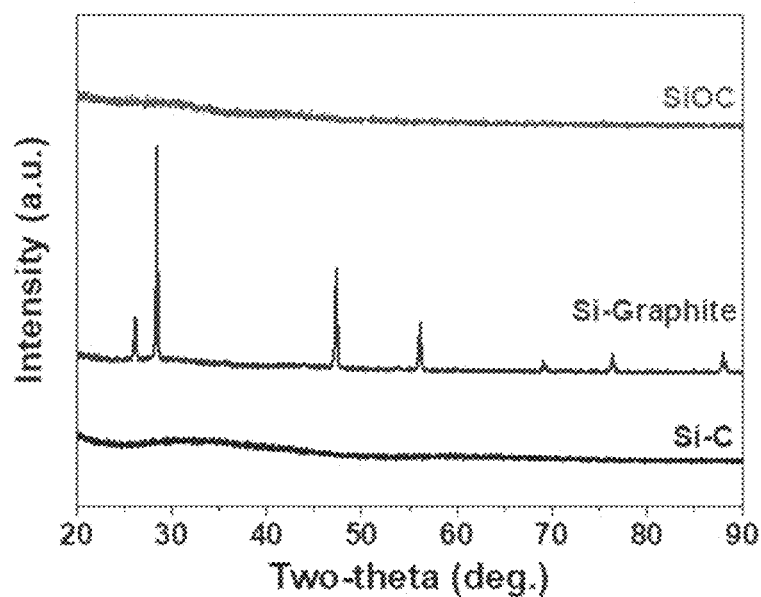
[Figure 9]
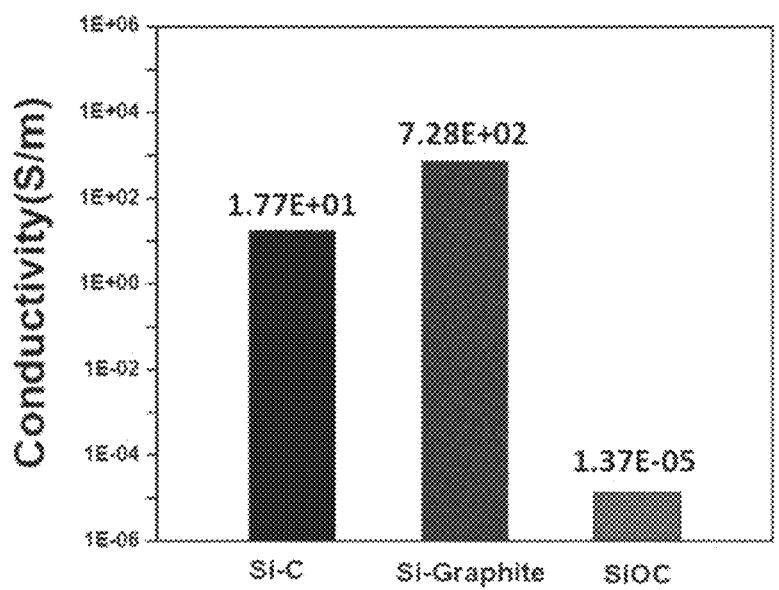

[Figure 10]
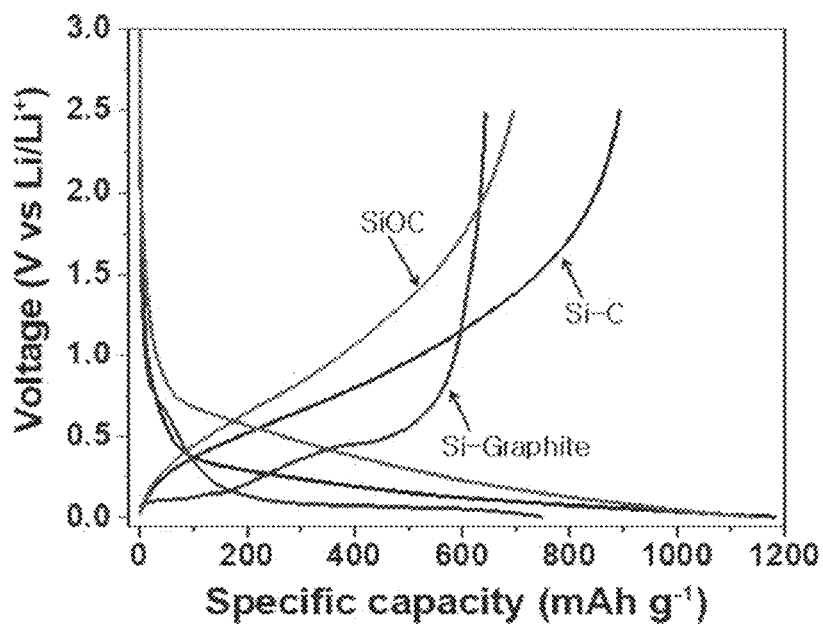
[Figure 11]
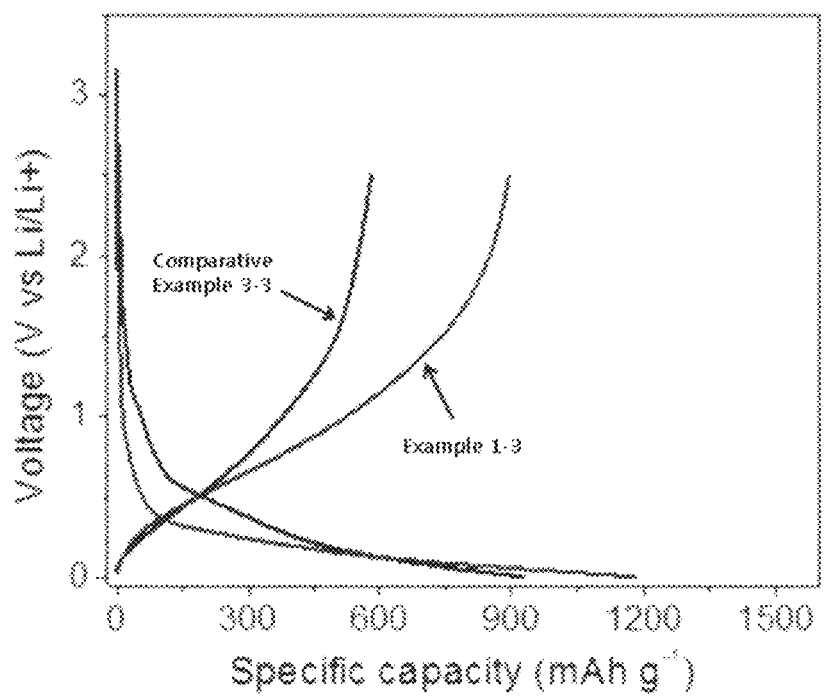

[Figure 12]
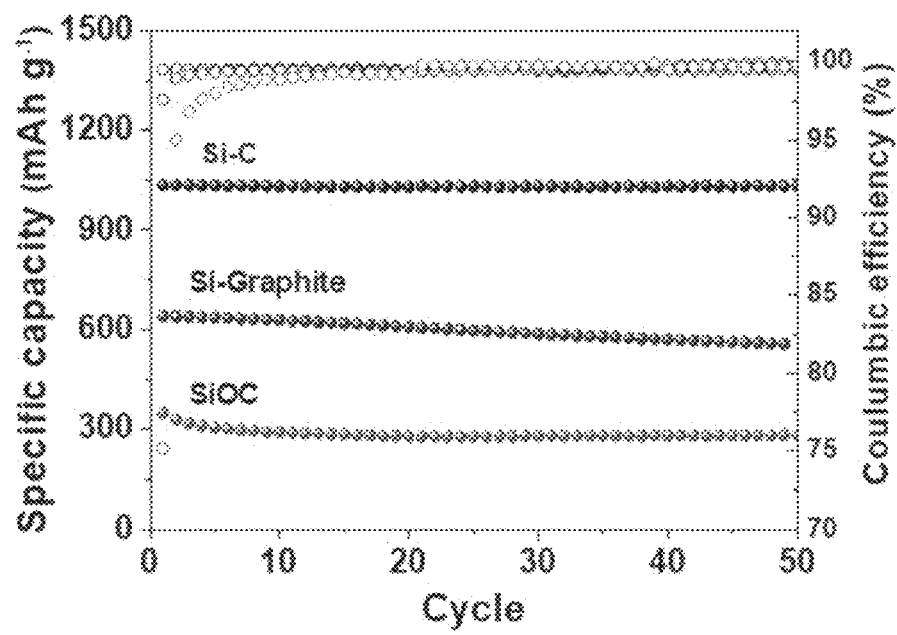
[Figure 13]
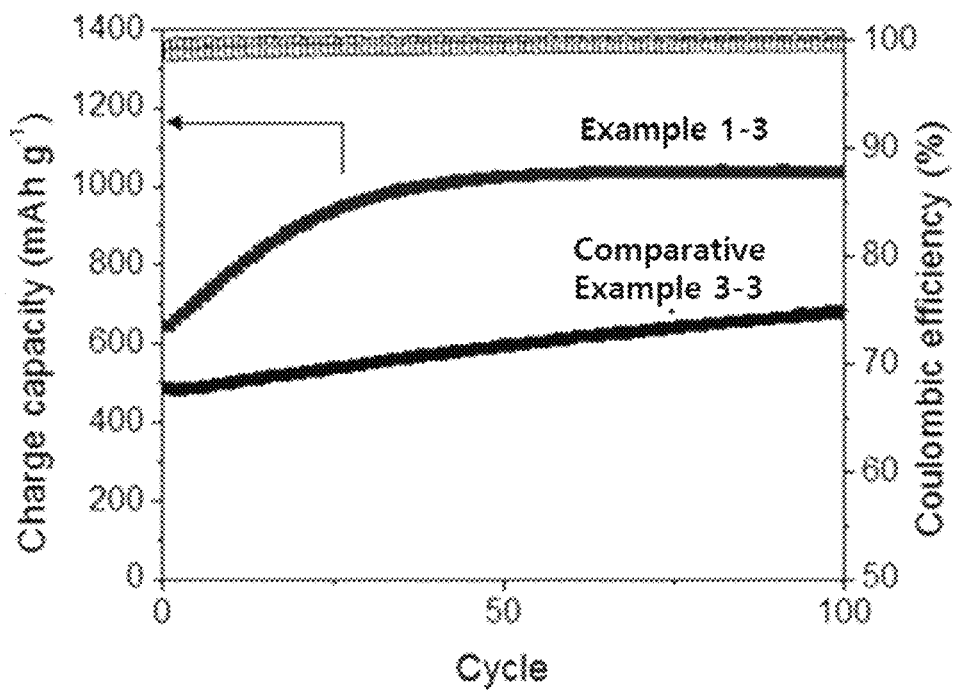

[Figure 14]
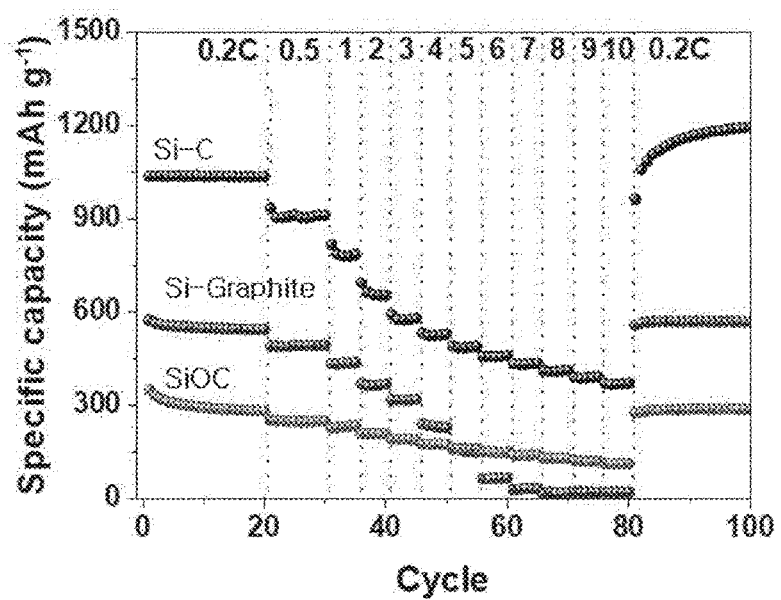

AMORPHOUS SILICON-CARBON COMPOSITE, PREPARATION METHOD THEREFOR, AND LITHIUM SECONDARY BATTERY COMPRISING SAME

CROSS-REFERENCE TO RELATED APPLICATIONS

This application is a Divisional of U.S. application Ser. No. 16/769,909, filed Jun. 4, 2020, now U.S. Pat. No. 11,616,233, which was filed as PCT International Application No. PCT/KR2019/002843 on Mar. 12, 2019, which claims priorities to and benefits of Korean Patent Application No. 10-2018-0029924, filed on Mar. 14, 2018 and Korean Patent Application No. 10-2019-0026971, filed on Mar. 8, 2019, the entire disclosures of which are incorporated herein by reference their entirety.

The present invention relates to an amorphous silicon-carbon composite, a method of manufacturing the same, a negative electrode for a lithium secondary battery and a lithium secondary battery comprising the same.

BACKGROUND ART

A lithium secondary battery (for example, a lithium ion battery), a nickel metal hydride battery and other secondary batteries are becoming increasingly important as a power source for a vehicle or a portable remote terminal such as a notebook computer. In particular, the lithium secondary battery, which can achieve high energy density with light weight, can be used as a high-energy power supply for in-vehicle use, thereby being expected to continue to increase in demand in the future.

The lithium secondary battery is manufactured by using a material capable of intercalating/deintercalating lithium ions as an active material of a negative electrode, installing a porous separator between the positive electrode and a negative electrode, and injecting a liquid electrolyte, wherein electricity is generated or consumed by the redox reaction resulting from the intercalation and deintercalation of lithium ions at the negative electrode and the positive electrode.

Specifically, in the lithium secondary battery, a variety of carbon-based materials including artificial graphite, natural graphite, hard carbon, and soft carbon capable of intercalating and deintercalating lithium have been applied as a negative electrode active material. A battery using graphite among the carbon-based materials as a negative electrode active material not only exhibits a high discharge voltage of 3.6 V, but also provides an advantage in terms of energy density of a lithium secondary battery, and is most widely used because it guarantees long lifetime of lithium secondary battery due to excellent reversibility. However, in the case of the graphite active material, when manufacturing the electrode plate, the density (theoretical density 2.2 g/cc) of the graphite is low, so that the capacity is low in terms of the energy density per unit volume of the electrode plate, and a side reaction with the organic electrolyte solution used is easily generated at a high voltage, and thus there are problems of generation of gas and as a result, capacity reduction.

In order to solve the problems of such carbon-based negative electrode active material, Si-based negative electrode active material with very high capacity compared with graphite has been developed and studied. However, a Si-based negative electrode material with a high capacity is accompanied by a severe volume change during charging/discharging, and thus there is a drawback that the particle cleavage is resulted and as a result, the lifetime characteristic is poor. Specifically, negative electrode active materials based on silicon or silicon oxides ($SiO_x$, $0<x<2$) capable of alloying and dealloying with lithium ions have a volume expansion up to 300%. During such volumetric expansion and contraction, the $SiO_x$ negative electrode active material is physically subjected to severe stress and pulverized out. As a result, the existing SEI layer is destroyed and a new interface is formed, while a new SEI layer is formed. This leads to continuous decomposition of the electrolyte solution and consumption of lithium ions, thereby deteriorating the cycle characteristics of the battery. Also, during continuous charging/discharging, the conductive structure is destroyed by the volume expansion and contraction of the $SiO_x$-based negative electrode active material and the durability of the electrode is deteriorated, thereby deteriorating the lifetime of the battery.

To solve these problems, a composite containing void capable of buffering the volume expansion has been proposed. However, in the case of a composite including a void structure, there are problems that the composite tends to be broken in the rolling process accompanied during the manufacturing of the electrode, and it is difficult to manufacture the electrode with a high loading amount due to its low density.

Also, as a method for solving these problems, nanotube type $SiO_x$ has been developed, but there are problems that the manufacturing process is difficult and commercialization is difficult because of high unit cost.

PRIOR ART DOCUMENT

Patent Document

Korean Patent No. 10-1612603, CARBON-SILICON COMPLEX, NEGATIVE ACTIVE MATERIAL FOR SECONDARY BATTERY INCLUDING THE SAME AND METHOD FOR PREPARING THE SAME.

DISCLOSURE

Technical Problem

It is an object of the present invention to provide an amorphous silicon-carbon composite which has a small volume change during charging/discharging of a lithium secondary battery and does not cause fragmentation.

It is another object of the present invention to provide a method of preparing an amorphous silicon-carbon composite in which the manufacturing process is simple by using the pyrolysis method.

It is another object of the present invention to provide a negative electrode for a lithium secondary battery, which can improve the electrical conductivity and lifetime characteristic of the battery by comprising the amorphous silicon-carbon composite, and a lithium secondary battery.

Technical Solution

In order to achieve the above objects, the present invention provides an amorphous silicon-carbon composite composed of silicon (Si) and carbon (C) mixed at a molecular level wherein the composite has a diameter of 10 nm to 1 μm.
}

In addition, the present invention provides a method for preparing an amorphous silicon-carbon composite comprising the steps of:
a) mixing a silane compound containing hydrocarbon with an organic solvent to prepare a mixed solution; and
b) pyrolyzing the mixed solution in an inert atmosphere and depositing it on a substrate.

In addition, the present invention provides a negative electrode for a lithium secondary battery comprising an active material; a conductive material; and a binder wherein the active material comprises the amorphous silicon-carbon composite of the present invention.

In addition, the present invention provides a lithium secondary battery comprising a positive electrode; a negative electrode; a separator interposed between the positive electrode and the negative electrode; and an electrolyte solution wherein the negative electrode is the negative electrode of the present invention.

Advantageous Effects

The amorphous silicon-carbon composite of the present invention has an advantage that silicon and carbon are mixed in a molecule unit, so that volume change during charging/discharging of the battery is small and fragmentation does not occur.

In addition, the method for preparing the amorphous silicon-carbon composite of the present invention has an advantage that the process is simple.

In addition, the lithium secondary battery comprising the amorphous silicon-carbon composite of the present invention has excellent electrical conductivity and lifetime characteristics.

DESCRIPTION OF DRAWINGS

FIG. 1 is a schematic diagram of an amorphous silicon-carbon composite of the present invention.

FIG. 2 is a transmission electron microscope (TEM) photograph of the amorphous silicon-carbon composite prepared in Example 1-1.

FIG. 3 is a photograph of the amorphous silicon-carbon composite (Si—C) prepared in Example 1-1 measured by using a transmission electron microscopy (TEM)—energy dispersive spectroscopy.

FIG. 4 is a scanning electron microscope (SEM) photograph of the silicon-carbon composite (Si-Graphite) prepared in Comparative Example 1-1.

FIG. 5 is a scanning electron microscope (SEM) photograph of the silicon-oxygen-carbon composite (SiOC) prepared in Comparative Example 2-1.

FIG. 6 is a scanning electron microscope (SEM) photograph of the amorphous silicon-carbon composite prepared in Comparative Example 3-1.

FIG. 7 is a transmission electron microscope (TEM) photograph of the amorphous silicon-carbon composite prepared in Comparative Example 3-1.

FIG. 8 is an X-ray diffraction graph of Experimental Example 1.

FIG. 9 is an electrical conductivity graph of Experimental Example 2.

FIG. 10 is an initial charging/discharging graph of Example 1-3, and Comparative Examples 1-3 and 2-3.

FIG. 11 is an initial charging/discharging graph of Example 1-3 and Comparative Example 3-3.

FIG. 12 is a graph of charging/discharging lifetime characteristics of Example 1-3, and Comparative Examples 1-3 and 2-3.

FIG. 13 is a graph of charging/discharging lifetime characteristics of Example 1-3 and Comparative Example 3-3.

FIG. 14 is a graph of charging/discharging characteristics according to C-rate of Example 1-3, and Comparative Examples 1-3 and 2-3.

BEST MODE

Hereinafter, the present invention will be described in more detail.

Silicon has about 10 times the capacity of graphite, but has a problem that volume change and fragmentation occur during charging/discharging of the battery, thereby deteriorating the lifetime characteristic of the battery.

Therefore, in order to solve the above problems, there has been proposed a method of simply mixing silicon and carbon or coating carbon on the surface of silicon and then mixing it with graphite. However, the above conventional techniques have not achieved smooth contact between silicon and carbon and thus are not excellent in ion conductivity and electrical conductivity, and also has non-uniform distribution of silicon and carbon and thus still did not solve the above problem.

Therefore, in order to solve the above problems, the present invention provides an amorphous silicon-carbon composite composed of silicon (Si) and carbon (C) mixed at a molecule unit.

The amorphous silicon-carbon composite of the present invention can solve the above-mentioned problems because silicon and carbon are mixed in a molecule unit.

Amorphous Silicon-Carbon Composite

The present invention relates to an amorphous silicon-carbon composite composed of silicon (Si) and carbon (C) mixed at a molecular level, wherein the composite has a diameter of 10 nm to 1 μm.

The amorphous silicon-carbon composite is formed by a pyrolysis deposition process for a silicon source and a carbon source. The composite comprises a silicon-carbon covalent bond, a silicon-silicon covalent bond, and a carbon-carbon covalent bond. The covalent bonds are irregularly present in the composite.

In addition, the amorphous silicon-carbon composite may further comprise a heteroatom. In this case, the composite may further comprise at least one of a heteroatom-carbon covalent bond and a heteroatom-silicon covalent bond, and the covalent bonds are irregularly present in the composite.

The heteroatom may be at least one selected from the group consisting of boron (B), phosphorus (P), nitrogen (N), and sulfur (S).

In the present invention, the amorphous silicon-carbon composite is formed by a pyrolysis deposition process of a silane compound containing hydrocarbon, and when the compound is pyrolyzed, the amorphous silicon-carbon composite is formed due to breakage of a part or whole bond of the compound. That is, the silicon source and the carbon source may be silane compounds including hydrocarbon. Accordingly, the composite of the present invention has a distribution of silicon and carbon without a concentration gradient, and thus when applying to lithium secondary battery, can minimize the problem of volume expansion, and improve the lifetime characteristic of the battery.

The amorphous silicon-carbon composite comprises silicon and carbon in a weight ratio of 3:7 to 7:3.

If the amount of silicon is less than the above range, the capacity of the battery may be decreased, and if the amount of silicon exceeds the above range, the lifetime of the battery may be decreased.

Also, if the amount of carbon is less than the above range, the lifetime of the battery may be decreased, and if the amount of carbon exceeds the above range, the capacity of the battery may be decreased.

The amorphous silicon-carbon composite may also comprise very small amounts of hydrogen and oxygen.

The amorphous silicon-carbon composite may be in the form of particles, and the diameter of the composite may be 10 nm to 1 μm, preferably 100 to 500 nm. If the diameter of the composite is less than 10 nm, the density of the composite is significantly lowered, as well as it is difficult to manufacture the electrode. If the diameter of the composite exceeds 1 μm, the electrical conductivity of the composite is greatly reduced, and the lifetime and rate performance of the battery may be degraded.

In addition, the amorphous silicon-carbon composite has a density of 0.2 to 0.6 g/cc, preferably 0.3 to 0.5 g/cc. If the density is less than 0.2 g/cc, the density of the electrode is lowered, that is, the thickness of the electrode is increased compared to the same loading amount, so that the energy density of the battery is lowered. If the density exceeds 0.6 g/cc, the resistance of the electrode increases and the rate performance decreases.

The amorphous silicon-carbon composite of the present invention is a mixture of silicon and carbon at a molecular level, which is composed of a plurality of silicon atoms, a plurality of carbon atoms and covalent bonds thereof, and can be used as a negative electrode active material of a lithium secondary battery.

If the amorphous silicon-carbon composite of the present invention is used in a lithium secondary battery, problems such as volume change and fragmentation of silicon occurring during charging/discharging of the battery can be solved, and the battery exhibits excellent electrical conductivity and lifetime characteristics.

Method for Preparing Amorphous Silicon-Carbon Composite

In addition, the present invention relates to a method for preparing an amorphous silicon-carbon composite comprising the steps of:
a) mixing a silane compound containing hydrocarbon with an organic solvent to prepare a mixed solution; and
b) pyrolyzing the mixed solution in an inert atmosphere and depositing it on a substrate.

The step a) is a step of mixing a silane compound containing hydrocarbon with an organic solvent to prepare a mixed solution.

The hydrocarbon-containing silane compound is a compound containing hydrocarbon as a functional group in the silane structure, and the kind thereof is not particularly limited. In the present invention, the silane compound may preferably comprises at least one selected from the group consisting of tetramethylsilane, dimethylsilane, methylsilane, triethylsilane, phenylsilane and diphenylsilane.

In addition, the silane compound containing hydrocarbon may be a compound further containing a heteroatom.

In the present invention, the type of the compound is not particularly limited as long as the heteroatom can form a covalent bond with silicon and carbon. The heteroatom may be at least one selected from the group consisting of boron (B), phosphorus (P), nitrogen (N), and sulfur (S).

The organic solvent may be used without particular limitation as long as it can dissolve a silane compound containing hydrocarbon. The organic solvent is preferably an organic solvent which has a boiling point of at least about 100° C., does not have high viscosity and does not cause carbonization at a temperature of 600° C. or higher. In the present invention, the organic solvent may specifically comprises, for example, at least one selected from the group consisting of toluene, benzene, ethylbenzene, xylene, mesitylene, heptane and octane.

The organic solvent is used for dilution in order to complement the boiling point of silane compounds which comprise hydrocarbon having a relatively low boiling point. If the pyrolysis temperature is 800° C. or more, since pyrolysis of organic solvents can occur together, additional carbon can be provided in the amorphous silicon-carbon composite to control the ratio of silicon and carbon.

The mixing of the compound and the organic solvent is preferably performed at room temperature for about 10 to 30 minutes.

The step b) is a step of pyrolyzing the mixed solution in an inert atmosphere and depositing it on a substrate.

Specifically, the pyrolysis is performed by a process of providing and bubbling an inert gas into the mixed solution, and the inert atmosphere is preferably an argon (Ar) gas atmosphere.

The pyrolysis temperature is 600 to 900° C. If the pyrolysis temperature is less than 600° C., pyrolysis of the silane compound containing hydrocarbon cannot be carried out and thus then amorphous silicon-carbon composite cannot be produced. If the pyrolysis temperature exceeds 900° C., not only direct decomposition of the organic solvent can occur and thus the mixing ratio of silicon and carbon can deviate from the desired mixing ratio, but also it is difficult to control the content of silicon and carbon.

If the content of hydrogen in the amorphous silicon-carbon composite is high, hydrogen gas is generated during the operation of the battery and thus the capacity of the battery is deteriorated. Even if the pyrolysis temperature is within the above temperature range, the higher the temperature is, the lower the content of hydrogen in the amorphous silicon-carbon composite can be. Therefore, the pyrolysis temperature is preferably 700 to 800° C.

In addition, the pyrolysis is performed for 10 minutes to 1 hour, preferably 30 minutes to 1 hour.

The amorphous silicon-carbon composite can be prepared by pyrolyzing compound or organic solvent contained in the mixed solution to obtain an amorphous silicon-carbon composite in which silicon (Si) and carbon (C) is finally mixed at a molecular level.

More specifically, the amorphous silicon-carbon composites produced by the pyrolysis are deposited on a substrate, and the step of separating the deposited composite may finally produce amorphous silicon-carbon composites in the form of particles. The method of separating the deposited composite is not particularly limited in the present invention, but a ball-mill process can be preferably used.

The diameter of the deposited composite has a size exceeding 1 μm, and the diameter of the amorphous silicon-carbon composite having a particle shape separated from the substrate is 10 nm to 1 μm, preferably 100 to 500 nm. If the diameter of the composite is less than 10 nm, not only the density of the composite is significantly lowered, but also it is difficult to manufacture the electrode. If the diameter exceeds 1 μm, the electrical conductivity of the composite is greatly reduced, and the lifetime and rate performance of the battery may be deteriorated.

The type of the substrate is not particularly limited in the present invention, but preferably silicon or an alumina substrate can be used.

In an embodiment of the present invention, a mixed solution prepared by mixing the compound and an organic solvent at room temperature is prepared. After the substrate is placed in the furnace, an inert gas is flowed into the furnace to make the atmosphere of the furnace become an inert atmosphere and then the temperature is constantly adjusted by heating the furnace. Thereafter, the mixed solution is poured into a furnace to pyrolyze the silane compound containing hydrocarbon and thus produce an amorphous silicon-carbon composite, and the composite is deposited on a substrate. An amorphous silicon-carbon composite in the form of particles can be obtained through a process such as ball mill process of the composite deposited on the substrate.

The amorphous silicon-carbon composite is prepared in the form of particles through a process of separating a composite, such as a ball mill process, after substrate deposition. The amorphous silicon-carbon composite is in the form of particles. The diameter of the amorphous silicon-carbon composite in the form of particles is 10 nm to 1 μm, preferably 100 nm to 500 nm.

The preparation method of the present invention is a method for preparing an amorphous silicon-carbon composite through a simple pyrolysis method, which has a merit that the manufacturing process is simple.

Negative Electrode for Lithium Secondary Battery

The present invention relates a negative electrode for a lithium secondary battery comprising an active material; a conductive material; and a binder, wherein the active material comprises the amorphous silicon-carbon composite of the present invention.

Specifically, the negative electrode comprises a negative electrode active material formed on a negative electrode current collector, and the negative electrode active material is an amorphous silicon-carbon composite prepared according to the present invention.

The negative electrode current collector may be specifically selected from the group consisting of copper, stainless steel, titanium, silver, palladium, nickel, alloys thereof, and combinations thereof. The stainless steel can be surface-treated with carbon, nickel, titanium or silver, and the alloy may be an aluminum-cadmium alloy. In addition to those, a nonconductive polymer the surface of which is treated with sintered carbon, i.e. a conductive material, or a conductive polymer, etc. may be used.

The conductive material is used to further improve the conductivity of the electrode active material. The conductive material is not particularly limited as long as it has electrical conductivity without causing chemical changes in the relevant battery, and for example, graphite such as natural graphite or artificial graphite; carbon black such as carbon black, acetylene black, Ketjen black, channel black, furnace black, lamp black, thermal black; conductive fibers such as carbon fibers and metal fibers; carbon fluoride; metal powders such as aluminum and nickel powder; conductive whiskers such as zinc oxide and potassium titanate; conductive metal oxides such as titanium oxide; polyphenylene derivatives may be used.

The binder is used for the bonding of the electrode active material and the conductive material and for the bonding to the current collector. Non-limiting examples of such binder may be polyvinylidene fluoride (PVDF), polyvinyl alcohol (PVA), polyacrylic acid (PAA), polymethacrylic acid (PMA), polymethyl methacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropylcellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof and the like.

In addition, the negative electrode may further comprise a filler and other additives.

Lithium Secondary Battery

In addition, the present invention relates to a lithium secondary battery comprising a positive electrode; a negative electrode; a separator interposed between the positive electrode and the negative electrode; and an electrolyte solution, wherein the negative electrode is the negative electrode of the present invention.

The constitution of the positive electrode, the negative electrode, the separator and the electrolyte solution of the lithium secondary battery is not particularly limited in the present invention, and is well known in the art.

The positive electrode comprises the positive electrode active material formed on the positive electrode current collector.

The positive electrode current collector is not particularly limited as long as it has high electrical conductivity without causing chemical changes in the relevant battery. For example, stainless steel, aluminum, nickel, titanium, sintered carbon, or aluminum or stainless steel whose surface is treated with carbon, nickel, titanium, silver or the like may be used. At this time, the positive electrode current collector may use various forms such as a film, sheet, foil, net, porous body, foam, nonwoven fabric and the like, which have fine irregularities on a surface, so as to increase the adhesion to the positive electrode active material.

The positive electrode active material constituting the electrode layer may be any positive electrode active material available in the art. Specific examples of such positive electrode active materials may be, but is not limited to, lithium metal; lithium cobalt-based oxides such as $LiCoO_2$; $Li_{1+x}Mn_{2-x}O_4$ (wherein x is from 0 to 0.33), lithium manganese-based oxides such as $LiMnO_3$, $LiMn_2O_3$, $LiMnO_2$; lithium copper-based oxide such as $Li_2CuO_2$; vanadium-based oxide such as $LiV_3O_8$, $V_2O_5$, $Cu_2V_2O_7$; lithium nickel-based oxide represented by $LiNi_{1-x}M_xO_2$ (wherein, M=Co, Mn, Al, Cu, Fe, Mg, B or Ga, x=0.01 to 0.3); lithium manganese composite oxide represented by $LiMn_{2-x}M_xO_2$ (wherein, M=Co, Ni, Fe, Cr, Zn or Ta, x=0.01 to 0.1) or $Li_2Mn_3MO_8$ (therein, M=Fe, Co, Ni, Cu or Zn); lithium-nickel-manganese-cobalt-based oxides represented by $Li(Ni_aCo_bMn_c)O_2$ (wherein, 0<a<1, 0<b<1, 0<c<1, a+b+c=1); sulfur or disulfide compound; phosphates such as $LiFePO_4$, $LiMnPO_4$, $LiCoPO_4$, $LiNiPO_4$; $Fe_2(MoO_4)_3$ or the like.

At this time, the electrode layer may further comprise a binder, a conductive material, a filler, and other additives in addition to the positive electrode active material. The binder and the conductive material are the same as those described above for the negative electrode for the lithium secondary battery.

The separator may be formed of a porous substrate. The porous substrate may be any porous substrate commonly used in an electrochemical device. For example, a polyolefin-based porous film or a nonwoven fabric may be used, but it is not particularly limited thereto.

The separator may be at least one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyether sulfone, polyphenylene oxide, polyphenylenesulfide, and polyethylene naphthalate or may be a porous substrate composed of a mixture of two or more thereof.

The electrolyte solution of the lithium secondary battery is a non-aqueous electrolyte solution containing a lithium salt which is composed of the lithium salt and a solvent. The solvent is a non-aqueous organic solvent, an organic solid electrolyte, and an inorganic solid electrolyte.

The lithium salt is a substance which is favorably dissolved in the non-aqueous electrolyte solution, and may be, for example, LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, LiC$_4$BO$_8$, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$·NLi, lithium chloroborane, lithium lower aliphatic carboxylate, 4-phenyl lithium borate, or lithium imide, etc.

The non-aqueous organic solvent may be, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and a polymer containing secondary dissociation group and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be used.

The non-aqueous electrolyte solution may further contain other additives for the purpose of improving charge-discharge characteristics, flame retardancy, and the like. Examples of such additives may be pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, fluoro-ethylene carbonate (FEC), propene sultone (PRS), vinylene carbonate (VC).

The lithium secondary battery according to the present invention can be manufactured by lamination, stacking and folding processes of the separator and the electrodes, in addition to the usual winding process. The battery case may be a cylindrical shape, a square shape, a pouch shape, a coin shape or the like.

Hereinafter, in order to facilitate understanding of the present invention, preferred examples are presented, but the following examples are intended to illustrate the invention only. It will be apparent to those skilled in the art that various changes and modifications can be made within the scope and spirit of the present invention, and also it is obvious that such changes and modifications fall within the scope of the appended claims.

Example 1

1-1. Preparation of Amorphous Silicon-Carbon Composite 10 mL of tetramethylsilane (TMS) was dissolved in 10 mL of toluene and mixed at room temperature for 10 to 30 minutes to prepare a mixed solution.

The furnace was filled with a silicon wafer to be deposited with an amorphous silicon-carbon composite, and then argon (Ar) gas (purity 99.999%) was flowed at a rate of 500 cc/min, and thus made the inside of the furnace became an inert atmosphere. Thereafter, the furnace was heated to a temperature of 750° C. at a heating rate of 10° C./min. After the temperature of the furnace reached 750° C., the temperature was maintained for 10 to 30 minutes to set the temperature inside the furnace to a constant value.

Thereafter, the mixed solution was poured into the furnace at a rate of 100 cc/min and bubbled with argon gas to pyrolyze the mixed solution.

After the pyrolysis, the temperature of the furnace is lowered to room temperature, and an amorphous silicon-carbon composites pyrolyzed on the substrate in the furnace were obtained. Through a ball mill process of the obtained composite, an amorphous silicon-carbon composite (Si—C) in which silicon (Si) and carbon (C) in the form of particles were mixed at a molecular level was prepared (FIGS. 2 and 3). The silicon-carbon composite had a diameter of about 200 nm and a density of 0.42 g/cc.

1-2. Manufacture of Electrode Plate

The amorphous silicon-carbon composite prepared in Example 1-1 was used as a negative electrode active material. 80 wt. % of a negative electrode active material, 10 wt. % of binder (PAA/CMC, 1:1 weight ratio), and 10 wt. % of conductive material (super-P) were dispersed in water to prepare a negative electrode slurry, and applied to a copper electrode to prepare an electrode plate.

1-3. Manufacture of Lithium Secondary Battery

The electrode plate prepared in Example 1-2 was used as a negative electrode. Lithium metal was used as a counter electrode, and a polyethylene separator was interposed between the negative electrode and the counter electrode. A mixed solvent of ethylene carbonate and diethyl carbonate (EC/DEC, 3:7, volume ratio) using 1.3M LiPF$_6$ was used as an electrolyte solution and 10 wt. % of FEC was used as an additive to prepare a coin cell.

Comparative Example 1

1-1. Preparation of Silicon-Carbon Composite

In order to adjust the discharging capacity to 600 mAh/g when evaluating the lifetime characteristics, about 15 wt. % of Si (theoretical capacity, about 3500 mAh/g) and about 85 wt. % of graphite (theoretical capacity, about 372 mAh/g) were simply mixed in the mortar to prepare a silicon-carbon composite (Si-Graphite) (FIG. 4).

1-2. Manufacture of Electrode Plate

An electrode plate was prepared in the same manner as in Example 1-2, except that the silicon-carbon composite (Si-Graphite) prepared in Comparative Example 1-1 was used as a negative electrode active material.

1-3. Manufacture of Lithium Secondary Battery

A coin cell was prepared in the same manner as in Example 1-3, except that the electrode plate prepared in Comparative Example 1-2 was used as a negative electrode.

Comparative Example 2

2-1. Preparation of Silicon-Oxygen-Carbon Composite 3 g of silicone oil was placed in an alumina container and heat treated at 900° C. in an inert atmosphere furnace. Thereafter, after the temperature inside the furnace was dropped to room temperature, a silicon-oxygen-carbon composite (SiOC) was obtained (FIG. 5).

2-2. Manufacture of Electrode Plate

The electrode plate was prepared in the same manner as in Example 1-2 except that the silicon-oxygen-carbon composite (SiOC) prepared in Comparative Example 2-1 was used as a negative electrode active material.

2-3. Manufacture of Lithium Secondary Battery

A coin cell was prepared in the same manner as in Example 1-3, except that the electrode plate prepared in Comparative Example 2-2 was used as a negative electrode.

Comparative Example 3

3-1. Preparation of Amorphous Silicon-Carbon Composite

An amorphous silicon-carbon composite (Si—C) was prepared in the same manner as in Example 1-1 except that the ball mill step was not performed (FIGS. 6 and 7). The silicon-carbon composite has a diameter of about 3 μm and a density of 0.66 g/cc.

3-2. Manufacture of Electrode Plate

The electrode plate was prepared in the same manner as in Example 1-2 except that the silicon-carbon composite (Si—C) prepared in Comparative Example 3-1 was used as a negative electrode active material.

3-3. Manufacture of Lithium Secondary Battery

A coin cell was prepared in the same manner as in Example 1-3, except that the electrode plate prepared in Comparative Example 3-2 was used as a negative electrode.

Experimental Example 1. Analysis of Crystal Structure of Composite

The XRD of the amorphous silicon-carbon composite (Si—C) prepared in Example 1-1, the silicon-carbon composite (Si-Graphite) prepared in Comparative Example 1-1, and the silicon-oxygen-carbon composite (SiOC) prepared in Comparative Example 2-1 was measured (FIG. 8).

The silicon-carbon composite (Si—C) of Example 1-1 exhibited wide range peaks at 32 degrees and 60 degrees. Since the silicon of the silicon-carbon composite (Si-Graphite) of Comparative Example 1-1 is a non-amorphous crystalline material, six silicon peaks (about 28 degrees, 47 degrees, 56 degrees, 69 degrees, 76 degrees, and 88 degrees) were clearly visible and graphite peaks were appeared at about 26, 35 and 44 degrees. Also, the silicon-oxygen-carbon composite (SiOC) of Comparative Example 2-1 showed wide range peaks at 30 degrees and 42 degrees.

Therefore, it was confirmed that the composite prepared in Example 1-1 and Comparative Examples 1-1, and 2-1 had different materials and physical properties.

Experimental Example 2. Evaluation of Electrical Conductivity of Electrode Plate Electrical conductivities of the electrode plates prepared in Example 1-2, and Comparative Examples 1-2 and 2-2 were measured using a four-point probe (FIG. 9).

The electrode plate of Example 1-2 exhibited a low resistance value because of its excellent electrical conductivity. The electrode plate of Comparative Example 1-2 showed low resistance value due to excellent electrical conductivity, since the graphite has a form in which carbon layers are layered one upon another, and thus has excellent electrical conductivity. However, the electrode plate of Comparative Example 2-2 comprises silicon-oxygen-carbon composite (SiOC), which is a ceramic material, and exhibits low electrical conductivity, which resulted in very high resistance.

Experimental Example 3. Evaluation of Battery Performance

Evaluation of initial charging/discharging, evaluation of life time characteristics, and evaluation of rate performance characteristics of the coin cells prepared in Example 1-3, and Comparative Examples 1-3, 2-3, and 3-3 were performed.

(1) Evaluation of Initial Charging/Discharging

In order to observe charging/discharging characteristics depending on the type of silicon composite, charging/discharging rates of the coin cells prepared in Example 1-3, and Comparative Examples 1-3 and 2-3 were fixed at 0.05 C-rate, and the operating voltage was set to 0.005 to 2.5 V, and then charging/discharging characteristics of the coin cells were measured (FIG. 10).

In all of the coin cells of Example 1-3, and Comparative Examples 1-3 and 2-3, the capacity decreased as the C-rate increased, and the initial capacity level was restored at the final 0.2 C-rate.

Also, in order to observe the characteristics of charging/discharging depending on the size of the diameter of the silicon composites, charging/discharging characteristics of the coin cells prepared in Example 1-3 and Comparative Example 3-3 were observed, and the experiment was carried out in the same manner as described above (FIG. 11).

The results are shown in Table 1 below.

TABLE 1

| | Composite size | Charging capacity (mAh/g) | Discharging capacity (mAh/g) | Efficiency (%) |
|---|---|---|---|---|
| Example 1-3 | about 200 nm | 1182 | 892.4 | 75.5 |
| Comparative Example 3-3 | about 3 μm | 927 | 579.4 | 62.5 |

From the results shown in Table 1, it can be seen that the silicon composite of Example 1-3 having a small diameter has better charging/discharging characteristics than the silicon composite of Comparative Example 3-3 having a diameter exceeding 1 μm.

From this, it can be seen that the smaller the diameter of the silicon composite is, the better the charging/discharging effect is.

(2) Evaluation of Lifetime Characteristics

In order to observe the lifetime characteristics depending on the type of silicon composite, the charging/discharging rate of the coin cells prepared in Example 1-3, Comparative Examples 1-3 and 2-3 was fixed at 0.2 C-rate, the operating voltage was set to 0.005 to 2.5 V, and then 50 cycles were performed to measure the lifetime characteristics of the coin cell. The results are shown in Table 2 and FIG. 12 below.

TABLE 2

|  | Initial capacity (mAh/g) | Capacity after 50 cycles (mAh/g) |
|---|---|---|
| Example 1-3 | 1036 | 1033 |
| Comparative Example 1-3 | 640 | 556 |
| Comparative Example 2-3 | 348 | 281 |

The coin cell of Example 1-3 resulted in excellent lifetime characteristics because the capacity of the cell was not substantially reduced even when the cycles progressed.

However, the coin cell of Comparative Example 1-3 has a very unstable connection since silicon is point-contacted with graphite particles. Therefore, in the coin cell of Comparative Example 1-3, as the cycle progressed, the volume expansion of silicon occurred, resulting in a decrease in the capacity of the cell and a poor lifetime characteristic.

Also, as the cycle of the coin cell of Comparative Example 2-3 progressed, the capacity of the cell decreased and the lifetime characteristic was not good.

In addition, in order to observe the lifetime characteristics depending on the size of the diameter of the silicon composites, the lifetime characteristics of the coin cells prepared in Example 1-3 and Comparative Example 3-3 were observed and the experiment was carried out in the same manner as described above except that 100 cycles were carried out (FIG. 13).

As a result, in Examples 1-3, capacity was saturated before 50 cycles and stable lifetime characteristics were shown, but, Comparative Example 3-3 did not saturate during 100 cycles and showed low capacity.

Therefore, it can be seen that the smaller the diameter of the silicon composite is, the better the lifetime characteristic is.

(3) Evaluation of Rate Performance

Charging and discharging of the coin cells prepared in Example 1-3, and Comparative Examples 1-3 and 2-3 were carried out at a rate of 0.2 C-rate for 20 cycles and 0.5 C-rate for 10 cycles, and then the rate of charging and discharging was controlled at 1, 2, 3, 4, 5, 6, 7, 8, 9, and 10 C-rate every 5 cycles, and finally, the rate was returned to 0.2 C-rate to confirm whether the capacity level was restored back to the initial capacity level (FIG. 14).

The cell capacity of all the coin cells of Example 1-3 and Comparative Example 2-3 decreased as the cycles progressed, and the cell capacity was restored to the initial capacity level at the last 0.2 C-rate.

However, in the case of the coin cell of Comparative Example 1-3, lithium ions are intercalated between the graphite layers, and the migration speed of lithium ions is very slow. Therefore, the coin cell of Comparative Example 1-3 showed a poor rate performance. In the case of the coin cell of Example 1-3, since the lithium ion is stored in the form of an alloy, it was confirmed that even though the electrical conductivity is relatively lower than that of graphite, the rate performance is excellent.

From the above results, it was confirmed that the amorphous silicon-carbon composites with diameters of 10 nm to 1 μm, which is composed of silicon and carbon mixed at a molecular level, exhibit excellent electrical conductivity, charging/discharging characteristics, and lifetime characteristics.

The invention claimed is:

1. A method for preparing an amorphous silicon-carbon composite comprising the steps of:
    a) mixing a silane compound containing hydrocarbon with an organic solvent to prepare a mixed solution; and
    b) pyrolyzing the mixed solution in an inert atmosphere and depositing the amorphous silicon-carbon composite on a substrate; and
    c) separating the deposited amorphous silicon-carbon composite from the substrate,
    wherein the separated amorphous silicon-carbon composite comprises:
    silicon and carbon mixed at a molecular level,
    wherein the separated amorphous silicon-carbon composite comprises a silicon-carbon covalent bond, a silicon-silicon covalent bond, and a carbon-carbon covalent bond, and
    wherein the silicon-carbon covalent bond, the silicon-silicon covalent bond, and the carbon-carbon covalent bond are irregularly present in the amorphous silicon-carbon composite.

2. The method of claim 1, wherein the silane compound containing hydrocarbon comprises at least one selected from the group consisting of tetramethylsilane, dimethylsilane, methylsilane, triethylsilane, phenylsilane, and diphenylsilane.

3. The method of claim 1, wherein in the step a), the silane compound containing hydrocarbon is a compound further containing a heteroatom.

4. The method of claim 3, wherein the heteroatom is at least one selected from the group consisting of boron, phosphorus, nitrogen, and sulfur.

5. The method of claim 1, wherein in the step a), the organic solvent comprises at least one selected from the group consisting of toluene, benzene, ethylbenzene, xylene, mesitylene, heptane, and octane.

6. The method of claim 1, wherein in the step b), the pyrolysis temperature is 600 to 900° C.

7. The method of claim 1, wherein in the step b), the pyrolysis is performed by a process of providing and bubbling an inert gas into the mixed solution.

8. The method of claim 1, wherein the separated amorphous silicon-carbon composite has a diameter of 10 nm to 1 μm.

9. The method of claim 1, wherein the separated amorphous silicon-carbon composite further comprises a heteroatom, and further comprises at least one bond of a heteroatom-carbon covalent bond and a heteroatom-silicon covalent bond.

10. The method of claim 9, wherein the heteroatom is at least one selected from the group consisting of boron, phosphorus, nitrogen, and sulfur.

11. The method of claim 1, wherein the separated amorphous silicon-carbon composite comprises silicon and carbon in a weight ratio of 3:7 to 7:3.

12. The method of claim 1, wherein the separated amorphous silicon-carbon composite has a density of 0.2 to 0.6 g/cc.

* * * * *